United States Patent
Tornatore

[11] Patent Number: 5,816,131
[45] Date of Patent: Oct. 6, 1998

[54] FLUID-CONTROLLED ACTUATOR ASSEMBLY

[75] Inventor: Giovanni Tornatore, S. Benigno Canavese, Italy

[73] Assignee: Magneti Marelli S.p.A., Milan, Italy

[21] Appl. No.: 845,763

[22] Filed: Apr. 25, 1997

[30] Foreign Application Priority Data

Apr. 26, 1996 [IT] Italy .................................. TO96A0335

[51] Int. Cl.$^6$ ........................................................ F01B 7/20
[52] U.S. Cl. .............................. 91/169 R; 91/464; 91/465; 92/13.1; 92/13.5; 92/13.6; 92/62
[58] Field of Search ............................ 91/465, 464, 462, 91/454, 420, 418, 169 R, 167 R; 92/6 D, 9, 52, 53, 51, 13.6, 13.4, 130 D, 131, 62

[56] References Cited

U.S. PATENT DOCUMENTS

| | | | |
|---|---|---|---|
| 2,248,426 | 7/1941 | Fowler | 92/51 |
| 2,716,965 | 9/1955 | Klamp | 92/51 |
| 4,422,474 | 12/1983 | Basraie et al. | 91/464 |
| 4,493,244 | 1/1985 | Stillfried et al. | 91/465 |
| 4,995,305 | 2/1991 | Garrigues et al. | 92/130 D |
| 5,125,326 | 6/1992 | Sarcona | 92/62 |
| 5,669,265 | 9/1997 | Adler | 74/335 |

FOREIGN PATENT DOCUMENTS

| | | |
|---|---|---|
| 0365033 | 4/1990 | European Pat. Off. . |
| 32 13 757 | 1/1983 | Germany . |
| 19507704 | 9/1996 | Germany . |
| 1061175 | 3/1967 | United Kingdom . |

Primary Examiner—Thomas E. Denion
Assistant Examiner—Bijan N. Karimi
Attorney, Agent, or Firm—Baker & Daniels

[57] ABSTRACT

A fluid-controlled actuator assembly for a gearbox of a vehicle. The actuator is provided with a four-position mobile element, with a first and a second chamber separated in a sealed manner from the mobile element, and with auxiliary positioning elements suitable for determining a stop position of the mobile element. Also included are first and second solenoid valves suitable for supplying pressurized fluid respectively to the first and to the second chamber and for discharging it from them, such that when the fluid is supplied into both the chambers, the mobile element is maintained by the auxiliary positioning elements in the stop position. When the fluid is supplied into one of the chambers and is discharged from the other, the mobile element adopts one of two lateral positions with respect to the stop position. First and second springs associated with the mobile element and suitable for maintaining the said mobile element in a rest position are interposed between the stop position and one of the lateral positions when the fluid is discharged from both the chambers.

11 Claims, 3 Drawing Sheets

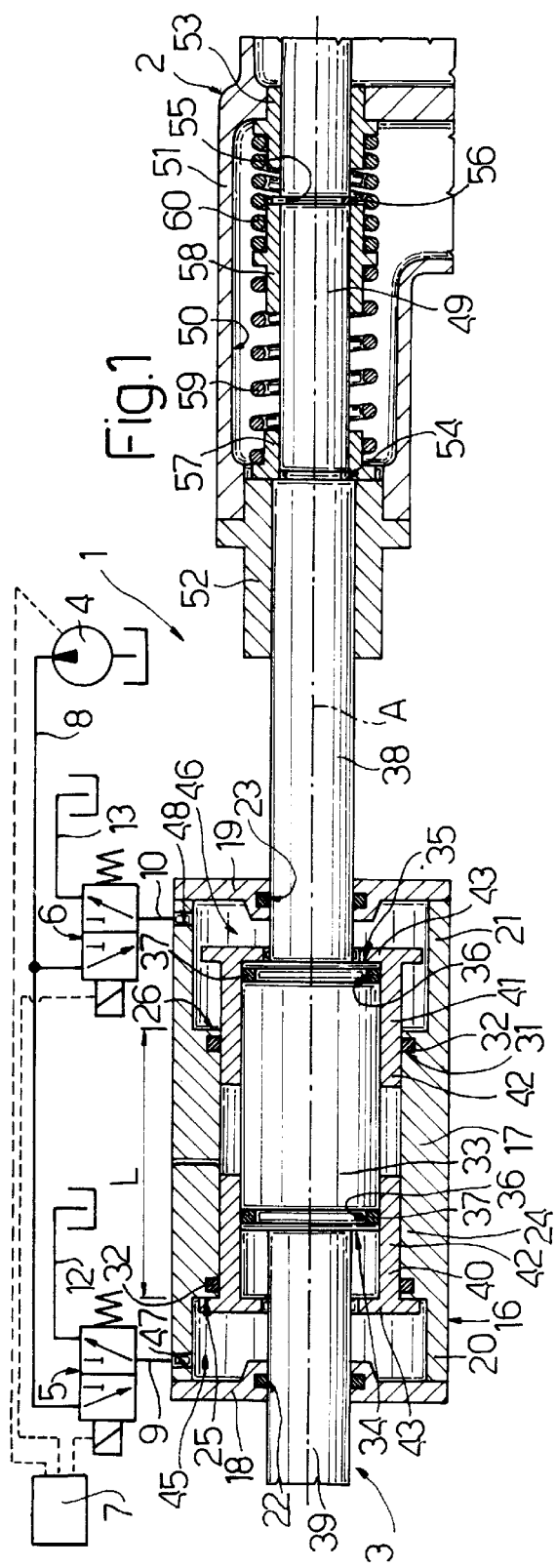
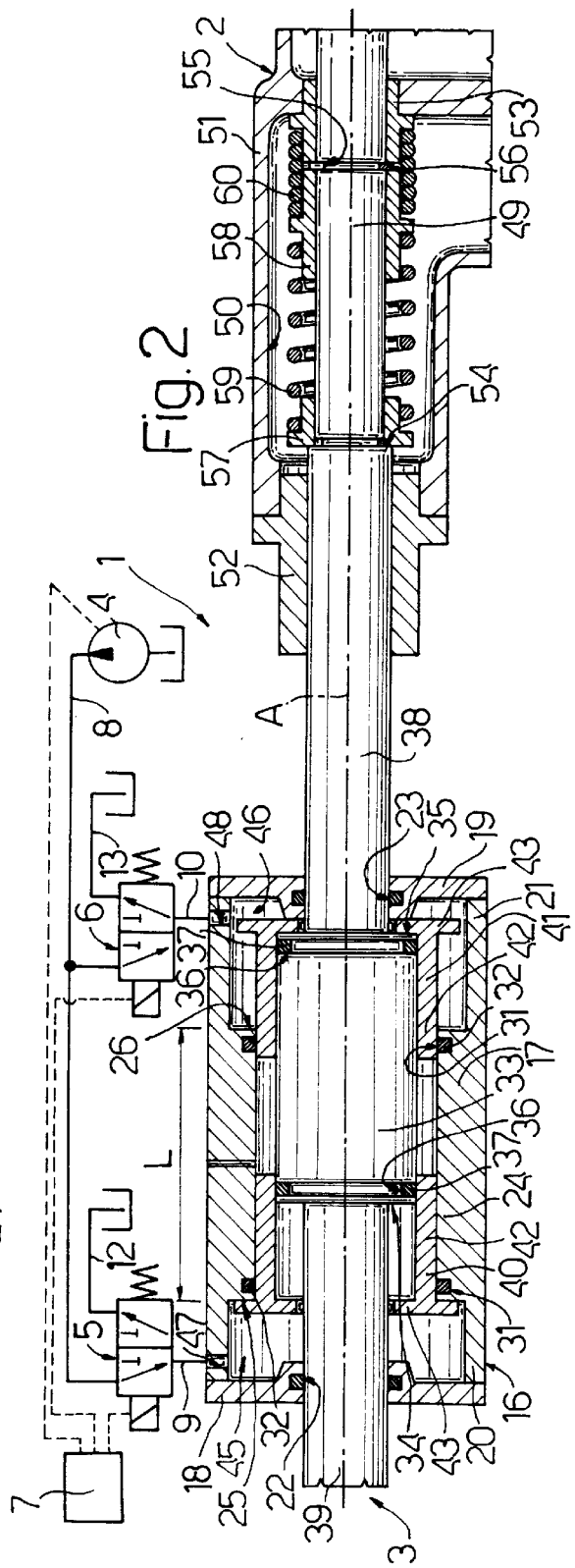

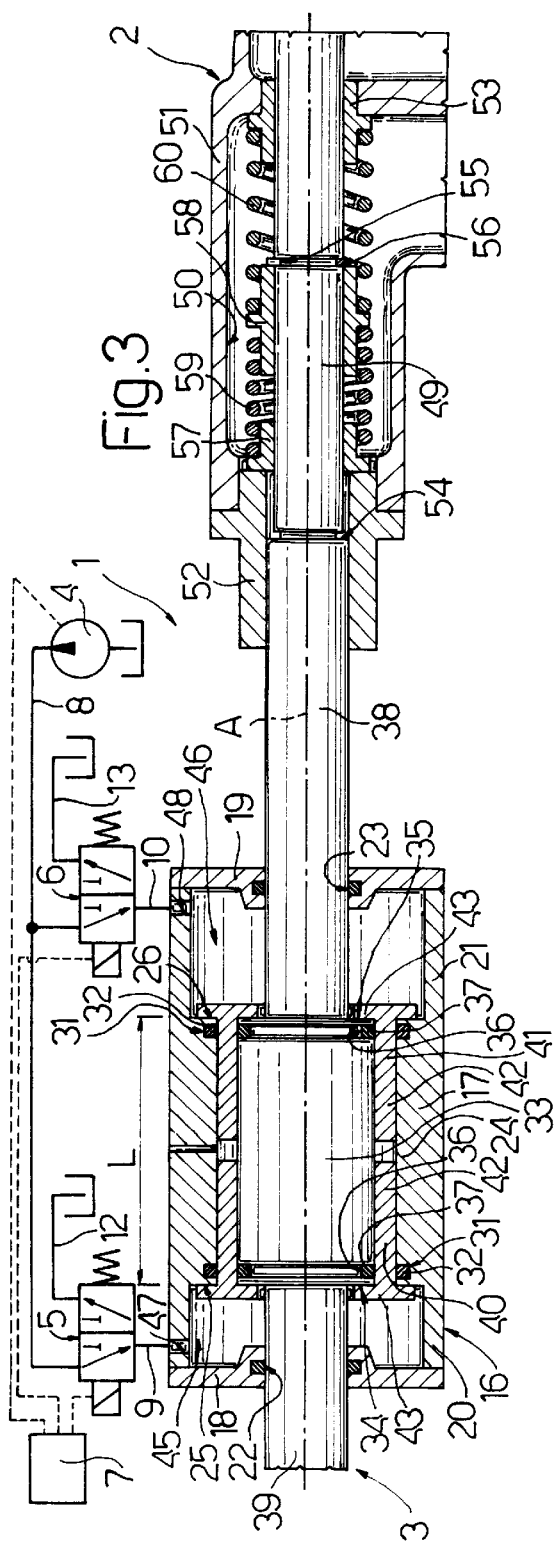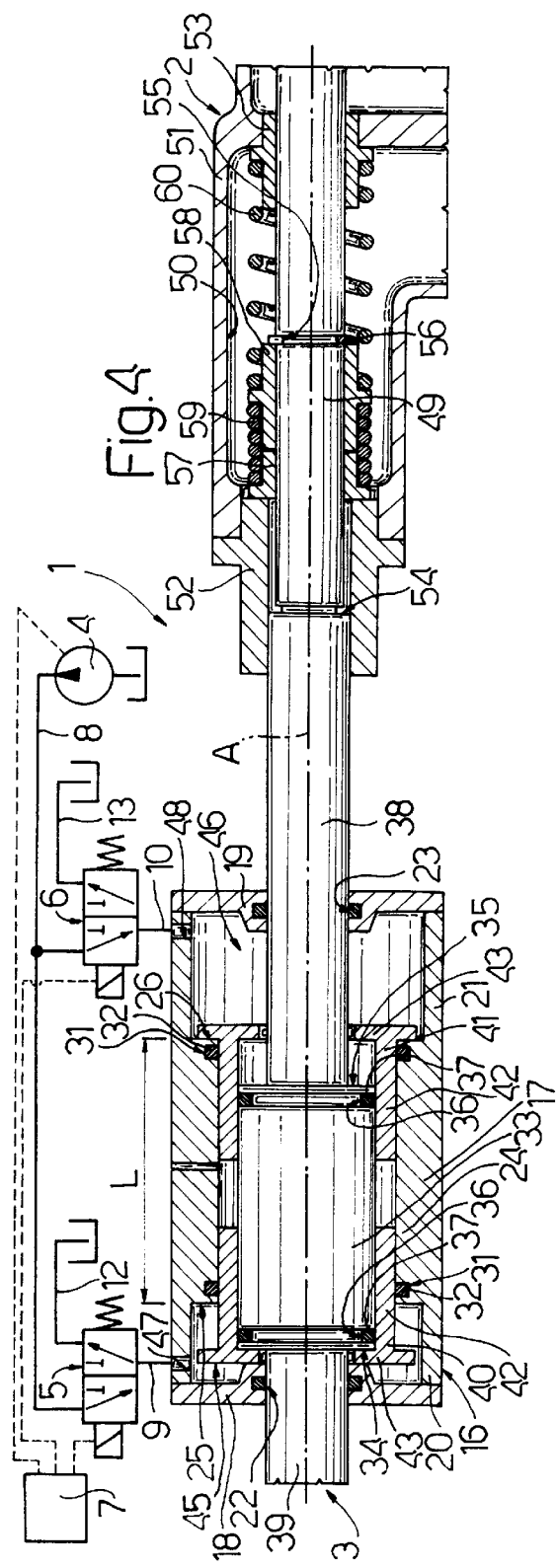

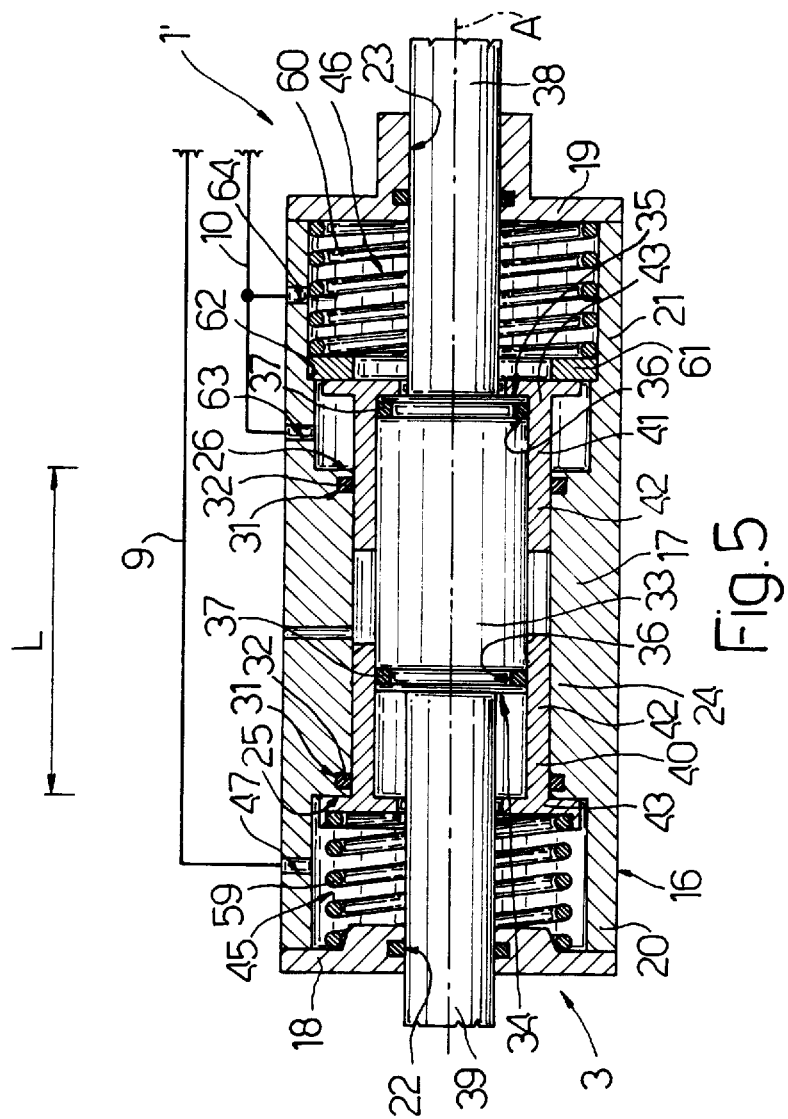

FLUID-CONTROLLED ACTUATOR ASSEMBLY

BACKGROUND OF THE INVENTION

The present invention relates to a fluid-controlled actuator assembly, particularly for operating a four-position gear-change lever in a gearbox of a vehicle.

The known actuator assemblies substantially comprise two pistons sliding in a sealed manner inside a cylinder in which they substantially define three chambers isolated from each other which are connected to a hydraulic pumping unit by means of the interposition of respective three-way and two-position solenoid valves; one of the pistons is usually provided with an active rod secured to the gear-change lever, the other is suitable for moving inside the cylinder and cooperating with the first substantially in order to vary its end-of-stroke position. By supplying pressurized fluid selectively or in combination with each other to the above-mentioned chambers it is possible to obtain four different axial, mechanically defined positions of the rod.

Such actuator assemblies are rather complex and expensive because of the presence of two pistons and the mechanical machining work to which the pistons themselves and the cylinder have to be subjected; furthermore they require the use of relatively complex fluidic components.

SUMMARY OF THE INVENTION

The object of the present invention is to produce a fluid-controlled actuator assembly which does not have the disadvantages associated with the actuator assemblies of known type and described above.

This object is achieved by the present invention in that it relates to a fluid-controlled actuator assembly for a gearbox of a vehicle, comprising a mobile element suitable for adopting four mechanically defined positions, a first and a second chamber separated in a sealed manner from the said mobile element, auxiliary positioning means suitable for determining a stop position of the said mobile element and first and second valve means suitable for supplying pressurized fluid respectively to the said first and second chamber and discharging it from them, such that when the said fluid is supplied into both the said chambers, the said mobile element is maintained by the said auxiliary positioning means in the said stop position and when the said fluid is supplied into one of the said chambers and is discharged from the other the said mobile element adopts one of two lateral positions with respect to the said stop position, characterized in that it comprises flexible means associated with the said mobile element and suitable for maintaining the said mobile element in a rest position interposed between the said stop position and one of the said lateral positions when the said fluid is discharged from both the said chambers.

BRIEF DESCRIPTION OF THE DRAWINGS

To provide a better understanding of the present invention, two preferred embodiments will be described below, purely by way of non-restrictive examples and with reference to the accompanying drawings, in which:

FIG. 1 shows a longitudinal section of a fluid-controlled actuator assembly produced according to the present invention;

FIGS. 2 to 4 show a longitudinal section of the actuator assembly of FIG. 1, in three different operating positions; and FIG. 5 shows a longitudinal section, and with some parts removed for reasons of clarity, of a different embodiment of a fluid-controlled actuator assembly produced according to the present invention.

DETAILED DESCRIPTION OF THE INVENTION

With reference to FIGS. 1 to 4, in its entirety 1 denotes a hydraulically controlled actuator assembly for a gearbox 2 (only partially shown) of a vehicle.

The assembly 1 comprises a double-acting hydraulic actuator 3, a pumping unit 4 suitable for sending pressurized oil to the actuator 3, a pair of solenoid valves 5, 6 of known type interposed between the actuator 3 and the unit 4, and an electronic unit 7 for controlling the unit 4 and the solenoid valves 5, 6 by means of respective electrical control signals S. The solenoid valves 5, 6 are of the three-way and two-position type and are connected to the unit 4 by means of a tubing 8, to the actuator 3 by means of respective pipes 9, 10 and to the outlet by means of respective pipes 12, 13; in the absence of control signals S each solenoid valve 5, 6 is usually arranged in a position of connection of the actuator 3 to the outlet.

The actuator 3 comprises a hollow cylinder 16 of axis A comprising a lateral wall 17 and two heads 18, 19 integrally connected in known manner to opposite end portions 20, 21 of the said wall 17 and having respective through holes 22, 23 of axis A. In particular the wall 17 has an intermediate portion 24 having an internal diameter smaller than the diameter of the portions 20, 21 and defining therewith a pair of annular shoulders 25, 26 facing respectively towards the heads 18, 19 and axially spaced apart by an amount L. On an internal annular surface of its own the portion 24 of the wall 17 has a pair of annular grooves 31 adjacent to the relative shoulders 25, 26 and housing respective gaskets 32.

The actuator 3 further comprises a piston 33 of axis A mounted in a sliding manner inside the cylinder 16, having a diameter smaller than the internal diameter of the portion 24 of the wall 17 and having an axial length equal to the distance L between the shoulders 25, 26. The piston 33 is provided with opposite head surfaces 34, 35 which are equal with respect to each other and has, on a lateral wall of its own, a pair of annular grooves 36 adjacent to the relative surfaces 34, 35 and housing respective gaskets 37. The piston 33 is also provided, at its own opposite ends, with two rods 38, 39 of axis A, having an equal diameter smaller than the diameter of the said piston 33 and sliding in a sealed manner inside the respective holes 22, 23 of the heads 18, 19; in particular the rod 38 is suitable for being connected to a gear-change lever (not shown) of the gearbox 2 whilst the rod 39 is suitable for cooperating with a sensor (not shown) for recording the axial position of the said rod 39.

The actuator 3 further comprises two substantially cylindrical bushes 40, 41, of axis A and equal with respect to each other, mounted in a sliding manner axially between the portion 24 of the wall 17 and the lateral wall of the piston 33 and facing respectively towards the heads 18, 19; with an external surface of its own each bush 40, 41 cooperates in a sealed manner with the relative gasket 32 and with an internal surface of its own with the relative gasket 37.

In particular, each bush 40, 41 comprises a main portion 42 inserted in a sliding manner between the portion 24 of the wall 17 and the lateral wall of the piston 33, and a companion portion 43 projecting radially in both directions from one end of the portion 42 and suitable for disposition in abutment both against part of a relative head surface 34, 35 of the piston 33 and against the corresponding shoulder 25, 26 of the wall 17 of the cylinder 16.

With the wall 17, with the respective heads 18, 19 and with the respective bushes 40, 41 the piston 33 therefore defines two chambers 45, 46 isolated in a sealed manner from each other; these chambers 45, 46 communicate with the respective pipes 9, 10 and hence with the corresponding solenoid valves 5, 6 by means of relative radial through holes 47, 48 produced in the wall 17.

When both the chambers 45, 46 are connected to the unit 4 the piston 33 is maintained by the bushes 40, 41 in a stop position in which the piston 33 itself is aligned axially with the portion 24 of the wall 17 and the portions 43 of the bushes 40, 41 are disposed in abutment against the respective shoulders 25, 26 of the wall 17 and against other respective head surfaces 34, 35 of the piston 33 (FIG. 3).

When the chamber 45 is connected to the unit 4 and the chamber 46 is connected to the outlet the piston 33 is disposed in a first lateral position with respect to the stop position in which the head surface 35 of the piston 33 maintains the portion 43 of the bush 41 in abutment against the head 19 and the portion 43 of the bush 40 is disposed in abutment against the shoulder 25 (FIG. 2).

Vice versa, when the chamber 45 is connected to the outlet and the chamber 46 is connected to the unit 4, the piston 33 is disposed in a second lateral position with respect to the stop position and opposite to the first lateral position, in which the head surface 34 of the piston 33 maintains the portion 43 of the bush 40 in abutment against the head 18 and the portion 43 of the bush 41 is disposed in abutment against the shoulder 26 (FIG. 4).

The rod 38 has a portion 49 external to the cylinder 16 housed with play inside a seat 50 produced in a box 51 of the gearbox 2 and inserted in a sliding manner into a pair of sleeves 52, 53 of axis A which are spaced apart and fixed in known manner to the said box 51. The portion 49 also has an external annular shoulder 54 and an annular seat 55 for a flexible ring 56 spaced from the said shoulder 54.

The assembly 1 further comprises a pair of bushings 57, 58 of axis A fitted in a sliding manner on the portion 49, mounted between the sleeves 52, 53 and interposed between the shoulder 54 and the ring 56. The assembly 1 also comprises a first helical spring 59 of helix axis A wound in a sliding manner on the portion 49 and compressed between the bushings 57, 58 so as to push the said bushings 57, 58 respectively against the shoulder 54 and against the ring 56 and render the bushing 58 integral with the portion 49; the assembly 1 further comprises a second helical spring 60 of helix axis A wound in a sliding manner on the portion 49 and compressed between the bushing 57 and the sleeve 53.

When both the chambers 45, 46 are connected to the outlet, the springs 59, 60 maintain the rod 38, and hence the piston 33, in a rest position in which the head surface 35 of the said piston 33 is disposed in an intermediate position between the shoulder 26 and the head 19, the portion 43 of the bush 40 is disposed in abutment against the shoulder 25 and the portion 43 of the bush 41 is disposed in contact with the said surface 35 of the piston 33 (FIG. 1).

From the above it is evident that the piston 33 is suitable for adopting four different, mechanically defined positions (rest, stop and first and second lateral) according to the operations of the solenoid valves 5, 6.

The operation of the actuator assembly 1 will be described on the basis of an initial configuration in which the solenoid valves 5, 6 connect the respective chambers 45, 46 to the outlet and the piston 33 is maintained by the springs 59, 60 in the above-mentioned rest position (FIG. 1).

By switching the solenoid valve 5 into a position of connection of the chamber 45 to the unit 4, the oil pressure acts on the portion 43 of the bush 40 which is kept in contact with the shoulder 25, and on the surface 34 of the piston 33 which is pushed towards the head 19, taking the bush 41 with it. In the course of the displacement of the piston 33 the rod 38 moves axially and takes with it the bushings 57, 58 towards the sleeve 53, compressing the spring 60, until the ring 56 is disposed in contact with the said sleeve 53; the piston 33 stops in its own first lateral position (FIG. 2).

Also by switching the solenoid valve 6 into a position of connection of the chamber 46 to the unit 4, the hydraulic pressure acts on the portion 43 of the bush 40, keeping it in contact with the shoulder 25, on the head surfaces 34, 35 of the piston 33 and on the portion 43 of the bush 41, pushing it towards the shoulder 26. Because the pressure acting on the bush 40 is discharged on the wall 17, the force acting on the bush 41 and on the surface 35 of the piston 33 is greater than the force acting on the surface 34 of the said piston 33. Therefore the bush 41 moves towards the shoulder 26 taking the piston 33 with it. In the course of the displacement of the piston 33 the rod 38 displaces axially and takes with it the bushings 57, 58 towards the sleeve 52; at a certain point in the travel of the rod 38 the bushing 57 comes into abutment against the sleeve 52 and, during the subsequent portion of travel, the bushing 58 approaches the said bushing 57, compressing the spring 59. When the bushing arrives in contact with the shoulder 26 the piston 33 is disposed into its own stop position in which it is in conditions of hydraulic equilibrium (FIG. 3).

By switching the solenoid valve 5 into a position of connection of the chamber 45 to the outlet, the oil pressure acts on the portion 43 of the bush 41 which is kept in contact with the shoulder 26, and on the piston 33 which is pushed towards the head 18, taking the bush 40 with it. During the displacement of the piston 33 the rod 38 displaces axially, subsequently bringing the bushing 58 close to the bushing 57 disposed in abutment against the sleeve 52, then compressing the spring 59 and permitting the spring 60 to lengthen axially; the piston 33 stops in its own second lateral position (FIG. 4).

To obtain a return to the initial configuration it is sufficient to switch the solenoid valve 5 into a position of connection of the chamber 45 to the outlet; in this way the springs 59, 60 return to their own initial lengths, taking the piston 33 back into the rest position.

FIG. 5 shows a different embodiment of a hydraulically controlled actuator assembly produced according to the present invention and denoted in its entirety by 1'; the assembly 1' will be described insofar as it differs from the assembly 1, using the same reference numerals to indicate parts which are similar or equivalent to those already described.

The assembly 1' differs from the assembly 1 in that the springs 59, 60 are housed inside the cylinder 16 and specifically in the respective chambers 45, 46 of the actuator 3. In particular, the spring 59 is wound in a sliding manner round the rod 39 and is compressed between the head 18 and the portion 43 of the bush 40 whilst the spring 60 is wound round the rod 38 and is compressed between the head 19 and a ring 61 of axis A suitable for being disposed in abutment against an annular shoulder 62 produced on the wall 17 of the cylinder 16 between the shoulder 26 and the said head 19, when both the chambers 45, 46 are connected to the outlet and when the chamber 46 is connected to the unit 4; furthermore, the ring 61 is suitable for defining an abutment for the bush 41, in the rest position and in the first lateral position of the piston 33. Finally, the pipe 13 is connected to the chamber 46 by means of two radial through holes 63, 64 produced in the portion 21 of the wall 17 and disposed on opposite sides of the shoulder 62.

The operation of the assembly 1' is similar to the operation of the assembly 1 and will not therefore be described.

From an examination of the features of the actuator assemblies 1, 1' produced according to the present invention, the advantages which it affords will be evident.

In particular, the actuator assemblies 1, 1' are simple and economical to produce, particularly because they provide a single piston in movement inside the cylinder. Furthermore, in order to obtain the above-mentioned four positions of the rod 38, and hence of the piston 33, only two three-way and two-position solenoid valves are required, with considerable simplification of the hydraulic operating circuit. In the case of the actuator assembly 1 it is possible to use a pair of springs 59, 60 already usually present in the gearboxes of vehicles, with resulting simplification of the construction of the said assembly 1.

Finally it will be evident that modifications to and variants of the actuator assemblies 1, 1' can be introduced which do not depart from the protective scope defined by the claims.

In particular, each solenoid valve 5, 6 could be replaced by a pair of two-way and two-position solenoid valves, one connected to the actuator 3 and to the pumping unit 4 and the other connected to the actuator 3 and to the outlet; furthermore, the double-acting actuator 3 could be replaced by a pair of single-acting actuators having respective pistons integrally connected together; finally, operation could be pneumatic rather than hydraulic.

I claim:

1. A fluid-controlled actuator assembly (1, 1') for a gearbox (2) of a vehicle, comprising a mobile element (33, 38, 39) suitable for adopting four mechanically defined positions, a first and a second chamber (45, 46) separated in a sealed manner from said mobile element (33, 38, 39), auxiliary positioning means (25, 26, 40, 41) suitable for determining a stop position of said mobile element (33, 38, 39) and a first and second valve means (5, 6) suitable for supplying pressurized fluid respectively to said first and second chamber (45, 46) and discharging it from them, such that when said fluid is supplied into both said chambers (45, 46), said mobile element (33, 38, 39) is maintained by said auxiliary positioning means (25, 26, 40, 41) in said stop position and when said fluid is supplied into one of said chambers (45, 46) and is discharged from the other (46, 45) said mobile element (33, 38, 39) adopts one of two lateral positions with respect to said stop position, characterized in that said actuator assembly comprises:

flexible means (59, 60) associated with said mobile element (33, 38, 39) and suitable for maintaining said mobile element (33, 38, 39) in a rest position interposed between said stop position and one of the said lateral positions when said fluid is discharged from both the said chambers (45, 46);

a cylinder (16) delimited by a lateral wall (17) and by a first and a second head (18, 19) wherein said mobile element comprises a piston (33) mounted in a sliding manner inside said cylinder (16) between said lateral positions, in which said piston is disposed adjacent respectively to said first and second head (18, 19), said auxiliary positioning means (25, 26, 40, 41) being interposed in a sealed manner between said piston (33) and said lateral wall (17) of the cylinder (16), said piston (33) defining with said lateral wall (17) of the cylinder (16), with said auxiliary positioning means (25, 26, 40, 41) and with the respective first and second head (18, 19) the said first and second chamber (45, 46);

said auxiliary positioning means comprising at least one bush (40, 41) coaxial with said piston (33) and sliding axially in a sealed manner between said piston (33) and said lateral wall (17) of the cylinder (16), and axial companion means (25, 26, 43) between said bush (40, 41) and said lateral wall (17) of the cylinder (16) and between the bush (40, 41) itself and said piston (33);

said lateral wall (17) of the cylinder (16) having at least one first annular shoulder (25, 26), and said bush (40, 41) comprising a main bearing portion (42) inserted in a sliding manner between said lateral wall (17) of the cylinder (16) and said piston (33), and a companion portion (43) projecting radially in both directions from said main portion (42) and suitable for disposition in abutment both against said piston (33) and against said first shoulder (25, 26); said first shoulder (25, 26) and said companion portion (43) of the bush (40, 41) defining said axial companion means.

2. An actuator assembly according to claim 1 and further comprising two said bushes (40, 41) having the relative said companion portions (43) facing towards the respective said heads (18, 19) and two said first annular shoulders (25, 26) facing towards the respective said heads (18, 19) and spaced apart axially by an amount (L) equal to the axial length of the said piston (33).

3. An actuator assembly according to claim 1, wherein said flexible means comprise a first and a second helical spring (59, 60), the helix coaxial with said cylinder (16), housed respectively in the said first and second chamber (45, 46) and interposed between said auxiliary positioning means (25, 26, 40, 41) and the respective said heads (18, 19).

4. An actuator assembly according to claim 3, characterized in that said first spring (59) is disposed between said first head (18) and the companion portion (43) of a relative said bush (40), and said second spring (60) is disposed between said second head (19) and a ring (61) coaxial with said piston (33); said ring (61) being suitable for defining an abutment for a relative said bush (41) and for disposition in abutment against a second annular shoulder (62) produced on said lateral wall (17) of the cylinder (16) between a relative one (26) of said first annular shoulders (25, 26) and second said head (19).

5. An actuator assembly according to claim 1 wherein said flexible means (59, 60) are external to the said actuator assembly (1) and belong to said gearbox (2).

6. An actuator assembly according to claim 1 wherein said mobile element comprises at least one rod (38) integral with said piston (33) and having a portion (49) projecting externally from said cylinder (16) and sliding between a pair of fixed, spaced-apart sleeves (52, 53), said actuator assembly (1) comprising at least one bushing (58) fitted on said projecting portion (49) and rendered integral with said projecting portion (49), said flexible means comprising a first and a second helical spring (59, 60) wound on said projecting portion (49) of said rod (38), disposed on opposite lateral sides of said bushing (58) and each interposed between that bushing (58) and a relative fixed said sleeve (52, 53).

7. An actuator assembly according to claim 1 comprising means of supply (4) of said pressurized fluid, said first and second valve means (5, 6) being interposed between said means of supply (4) and respectively the said first and second chamber (45, 46).

8. An actuator assembly according to claim 7, characterized in that each of said valve means comprises a three-way and two-position solenoid valve (5, 6) connected to said means of supply (4), to the outlet and to a relative said chamber (45, 46), each said solenoid valve (5, 6) being normally disposed in a position of connection of a relative said chamber (45, 46) to the outlet.

9. A fluid-controlled actuator assembly (1, 1') for a gearbox (2) of a vehicle, comprising a mobile element (33, 38, 39) suitable for adopting four mechanically defined positions, a first and a second chamber (45, 46) separated in a sealed manner from said mobile element (33, 38, 39), auxiliary positioning means (25, 26, 40, 41) suitable for determining a stop position of said mobile element (33, 38, 39) and a first and second valve means (5, 6) suitable for supplying pressurized fluid respectively to said first and second chamber (45, 46) and discharging it from them, such that when said fluid is supplied into both said chambers (45, 46), said mobile element (33, 38, 39) is maintained by said auxiliary positioning means (25, 26, 40, 41) in said stop position and when said fluid is supplied into one of said chambers (45, 46) and is discharged from the other (46, 45) said mobile element (33, 38, 39) adopts one of two lateral positions with respect to said stop position, characterized in that said actuator assembly comprises:

flexible means (59, 60) associated with said mobile element (33, 38, 39) and suitable for maintaining said mobile element (33, 38, 39) in a rest position interposed between said stop position and one of the said lateral positions when said fluid is discharged from both the said chambers (45, 46);

a cylinder (16) delimited by a lateral wall (17) and by a first and a second head (18, 19) wherein said mobile element comprises a piston (33) mounted in a sliding manner inside said cylinder (16) between said lateral positions, in which said piston is disposed adjacent respectively to said first and second head (18, 19), said auxiliary positioning means (25, 26, 40, 41) being interposed in a sealed manner between said piston (33) and said lateral wall (17) of the cylinder (16), said piston (33) defining with said lateral wall (17) of the cylinder (16), with said auxiliary positioning means (25, 26, 40, 41) and with the respective first and second head (18, 19) the said first and second chamber (45, 46);

said flexible means comprising a first and a second helical spring (59, 60), the helix coaxial with said cylinder (16), housed respectively in the said first and second chamber (45, 46) and interposed between said auxiliary positioning means (25, 26, 40, 41) and the respective said heads (18, 19).

10. A fluid-controlled actuator assembly (1, 1') for a gearbox (2) of a vehicle, comprising a mobile element (33, 38, 39) suitable for adopting four mechanically defined positions, a first and a second chamber (45, 46) separated in a sealed manner from said mobile element (33, 38, 39), auxiliary positioning means (25, 26, 40, 41) suitable for determining a stop position of said mobile element (33, 38, 39) and a first and second valve means (5, 6) suitable for supplying pressurized fluid respectively to said first and second chamber (45, 46) and discharging it from them, such that when said fluid is supplied into both said chambers (45, 46), said mobile element (33, 38, 39) is maintained by said auxiliary positioning means (25, 26, 40, 41) in said stop position and when said fluid is supplied into one of said chambers (45, 46) and is discharged from the other (46, 45) said mobile element (33, 38, 39) adopts one of two lateral positions with respect to said stop position, characterized in that said actuator assembly comprises:

flexible means (59, 60) associated with said mobile element (33, 38, 39) and suitable for maintaining said mobile element (33, 38, 39) in a rest position interposed between said stop position and one of the said lateral positions when said fluid is discharged from both the said chambers (45, 46);

wherein said flexible means (59, 60) are external to the said actuator assembly (1) and belong to said gearbox (2).

11. A fluid-controlled actuator assembly (1, 1') for a gearbox (2) of a vehicle, comprising a mobile element (33, 38, 39) suitable for adopting four mechanically defined positions, a first and a second chamber (45, 46) separated in a sealed manner from said mobile element (33, 38, 39), auxiliary positioning means (25, 26, 40, 41) suitable for determining a stop position of said mobile element (33, 38, 39) and a first and second valve means (5, 6) suitable for supplying pressurized fluid respectively to said first and second chamber (45, 46) and discharging it from them, such that when said fluid is supplied into both said chambers (45, 46), said mobile element (33, 38, 39) is maintained by said auxiliary positioning means (25, 26, 40, 41) in said stop position and when said fluid is supplied into one of said chambers (45, 46) and is discharged from the other (46, 45) said mobile element (33, 38, 39) adopts one of two lateral positions with respect to said stop position, characterized in that said actuator assembly comprises:

flexible means (59, 60) associated with said mobile element (33, 38, 39) and suitable for maintaining said mobile element (33, 38, 39) in a rest position interposed between said stop position and one of the said lateral positions when said fluid is discharged from both the said chambers (45, 46);

a cylinder (16) delimited by a lateral wall (17) and by a first and a second head (18, 19) wherein said mobile element comprises a piston (33) mounted in a sliding manner inside said cylinder (16) between said lateral positions, in which said piston is disposed adjacent respectively to said first and second head (18, 19), said auxiliary positioning means (25, 26, 40, 41) being interposed in a sealed manner between said piston (33) and said lateral wall (17) of the cylinder (16), said piston (33) defining with said lateral wall (17) of the cylinder (16), with said auxiliary positioning means (25, 26, 40, 41) and with the respective first and second head (18, 19) the said first and second chamber (45, 46);

said mobile element comprises at least one rod (38) integral with said piston (33) and having a portion (49) projecting externally from said cylinder (16) and sliding between a pair of fixed, spaced-apart sleeves (52, 53), said actuator assembly (1) comprising at least one bushing (58) fitted on said projecting portion (49) and rendered integral with said projecting portion (49), said flexible means comprising a first and a second helical spring (59, 60) wound on said projecting portion (49) of said rod (38), disposed on opposite lateral sides of said bushing (58) and each interposed between that bushing (58) and a relative fixed said sleeve (52, 53).

* * * * *